US011610070B2

(12) United States Patent
Yoshida

(10) Patent No.: US 11,610,070 B2
(45) Date of Patent: Mar. 21, 2023

(54) ELECTRONIC DEVICE FOR DETERMINING A CHARACTER TYPE IN A CHARACTER COMBINATION AND PROCESSES CAPABLE OF EXECUTION THEREWITH, AND CONTROL METHOD FOR AND STORAGE MEDIUM STORING PROGRAM FOR SAME

(71) Applicant: CASIO COMPUTER CO., LTD., Tokyo (JP)

(72) Inventor: Kohei Yoshida, Hanno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 610 days.

(21) Appl. No.: 16/567,602

(22) Filed: Sep. 11, 2019

(65) Prior Publication Data
US 2020/0104374 A1 Apr. 2, 2020

(30) Foreign Application Priority Data
Oct. 2, 2018 (JP) .............................. JP2018-187603

(51) Int. Cl.
*G06F 40/53* (2020.01)
*G06F 3/04883* (2022.01)
*G06F 3/0481* (2022.01)

(52) U.S. Cl.
CPC ............ *G06F 40/53* (2020.01); *G06F 3/0481* (2013.01); *G06F 3/04883* (2013.01)

(58) Field of Classification Search
None
See application file for complete search history.

(56) References Cited

U.S. PATENT DOCUMENTS

| 7,143,350 B2* | 11/2006 | Jurion ................... G06F 40/129 715/257 |
| 7,921,361 B2* | 4/2011 | Gunn ................... G06F 3/04883 382/187 |
| 9,298,276 B1* | 3/2016 | Bi .......................... G06F 3/0237 |
| 2013/0021286 A1* | 1/2013 | Sudo .................... G06F 3/04886 345/173 |

(Continued)

FOREIGN PATENT DOCUMENTS

| JP | H06-51891 A | 2/1994 |
| JP | 2001-022748 A | 1/2001 |

(Continued)

OTHER PUBLICATIONS

JPO; Application No. 2018-187603; Notice of Reasons for Refusal dated Aug. 30, 2022.

*Primary Examiner* — Ariel Mercado
(74) *Attorney, Agent, or Firm* — Fitch, Even, Tabin & Flannery LLP

(57) ABSTRACT

There is provided an electronic device including a display, a designation device configured to designate any range of a character string displayed on the display by a user, and a processor. The processor is configured to target as a processing target at least one character included in the range designated by the designation device, determine to which of a plurality of predetermined combinations a combination of a character type of the at least one character and a position of the at least one character in the range corresponds, and execute a process on characters included in the designated range based on the determined combination.

22 Claims, 5 Drawing Sheets

(56) References Cited

U.S. PATENT DOCUMENTS

2013/0046544 A1\* 2/2013 Kay .................. G06F 3/023
 345/169
2016/0125275 A1\* 5/2016 Hamada ............. G06F 40/279
 382/229

FOREIGN PATENT DOCUMENTS

| JP | 2010-097326 A | 4/2010 |
| --- | --- | --- |
| JP | 2010-122799 A | 6/2010 |
| JP | 2010-152500 A | 7/2010 |
| JP | 2011-158947 A | 8/2011 |
| JP | 2012-027721 A | 2/2012 |
| JP | 2013-222458 A | 10/2013 |
| JP | 5775291 A | 9/2015 |

\* cited by examiner

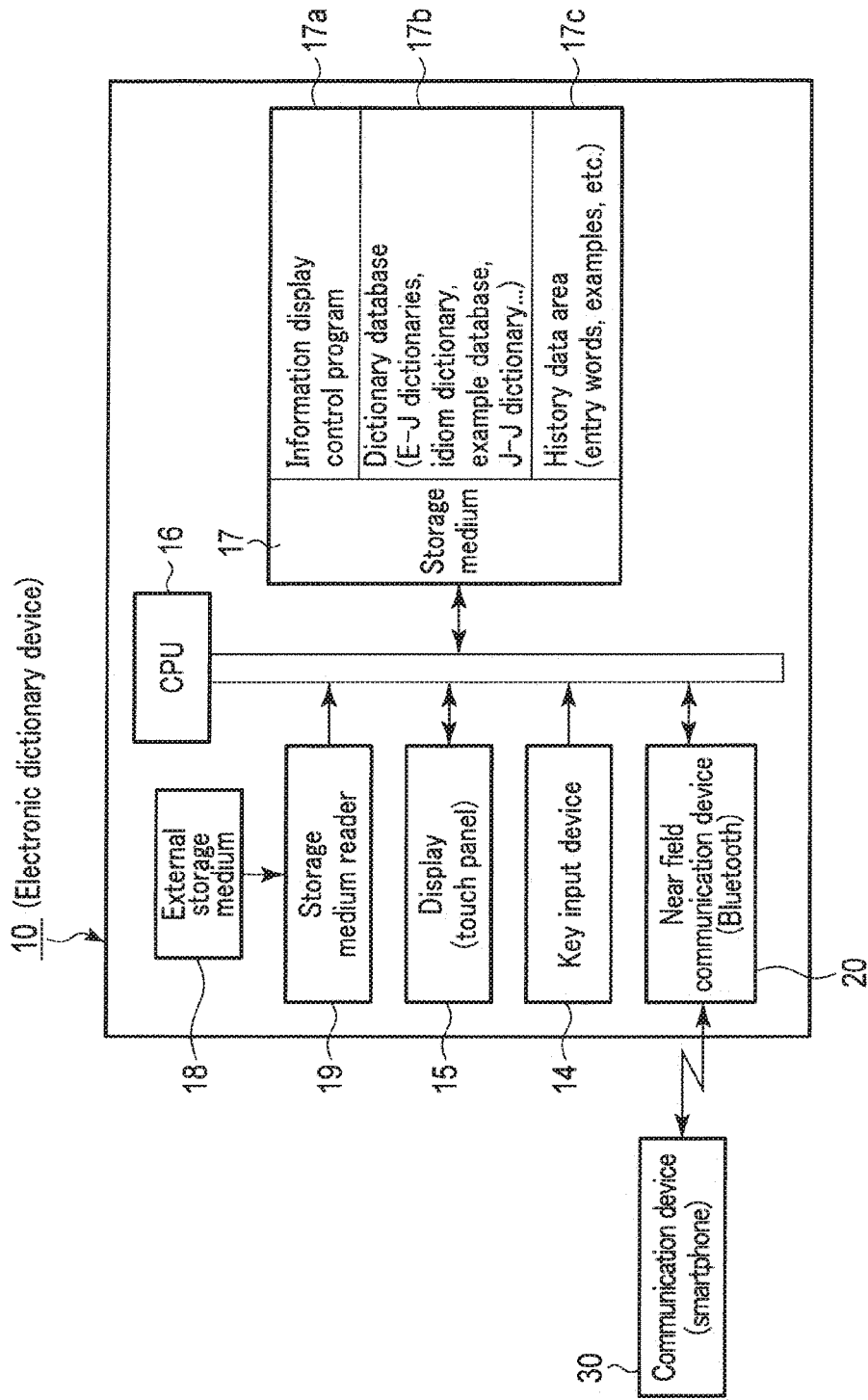
F I G. 2

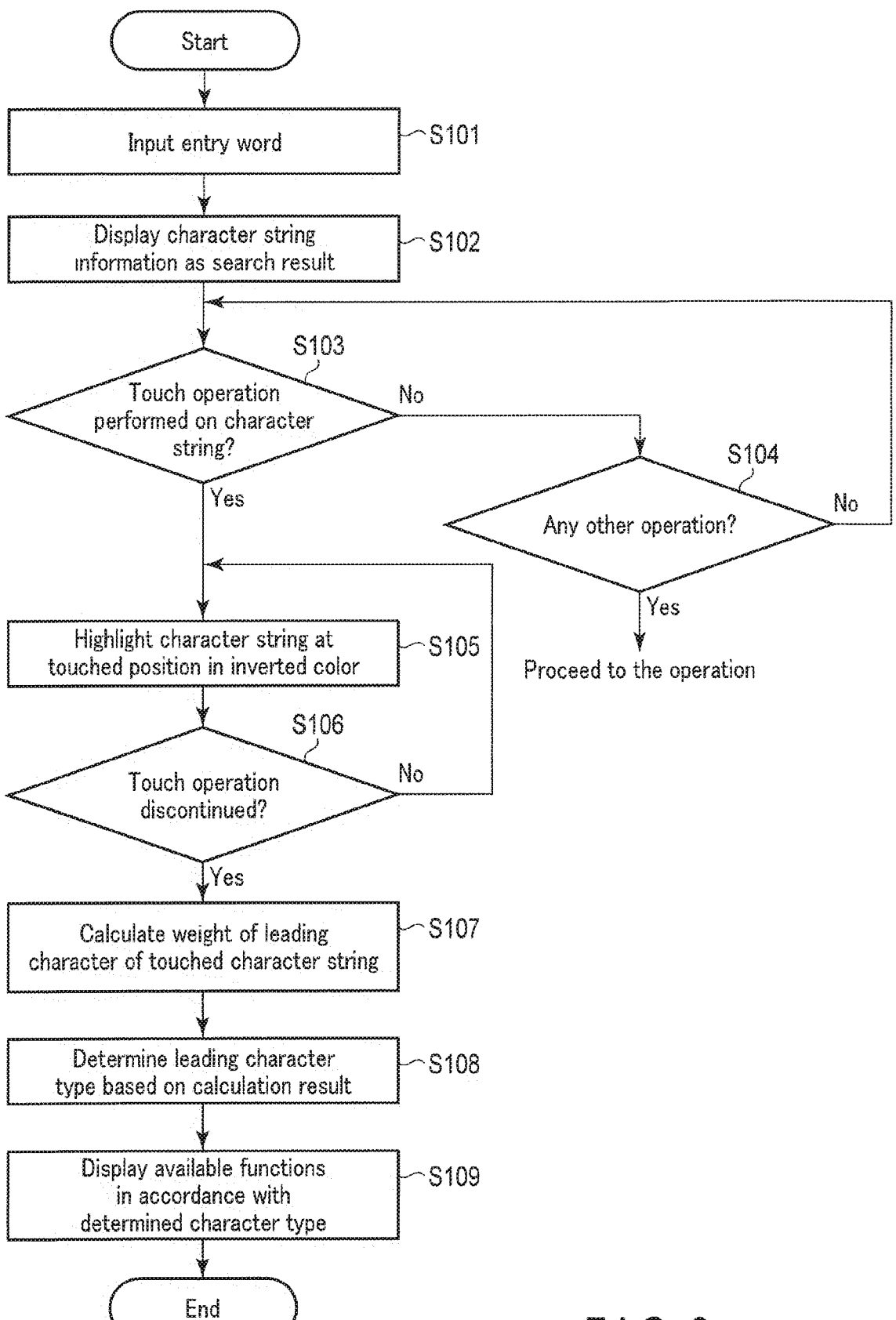
F I G. 3

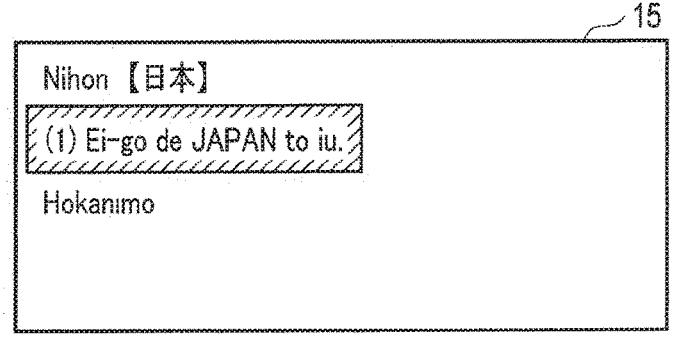

FIG. 4

| | Pattern | Example character string | Weight calculation | Selected character |
|---|---|---|---|---|
| 1 | Sym-Jpn (or Sym-Eng) | Ei-go de JAPAN to iu. | Sym: 3 (3 for 1st character × 1 for Sym) Jpn: 4 (2 for 2nd character × 2 for Jpn) | Jpn (or Eng) |
| 2 | Sym-Sym | (3)【日本】 | Sym: 5 (3 for 1st character × 1 for Sym + 2 for 2nd character × 1 for Sym) | Sym |
| 3 | Jpn-Sym (or Eng-Sym) | Mono・ koto no koto | Jpn: 6 (3 for 1st character × 2 for Jpn) Sym: 2 (2 for 2nd character × 1 for Sym) | Jpn (or Eng) |
| 4 | Eng-Jpn | JAPAN to iu | Eng: 6 (3 for 1st character × 2 for Eng) Jpn: 4 (2 for 2nd character × 2 for Jpn) | Eng |
| 5 | Eng-Eng | No calculation applied (For English, a set of consecutively written characters is counted as one word with a space or any other symbol inserted between two sets) | | |
| 6 | Jpn-Eng | de JAPAN to iu | Jpn: 6 (3 for 1st character × 2 for Jpn) Eng: 4 (2 for 2nd character × 2 for Eng) | Jpn |
| 7 | Jpn-Jpn | Ei-go de JAPAN to iu | Jpn: 10 (3 for 1st character × 2 for Jpn + 2 for 2nd character × 2 for Jpn) | Jpn |

FIG. 5

| Leading character | Entry word jump | Idiom/ example jump | Audio | Highlighter | Textbook |
|---|---|---|---|---|---|
| English | ○ | ○ | ○ | ○ | × |
| Japanese | ○ | × | × | ○ | ○ |
| Chinese/Korean/Russian | ○ | × | × | ○ | × |
| Symbol | × | × | × | ○ | × |

FIG. 6

ELECTRONIC DEVICE FOR DETERMINING A CHARACTER TYPE IN A CHARACTER COMBINATION AND PROCESSES CAPABLE OF EXECUTION THEREWITH, AND CONTROL METHOD FOR AND STORAGE MEDIUM STORING PROGRAM FOR SAME

CROSS-REFERENCE TO RELATED APPLICATIONS

This application is based upon and claims the benefit of priority from Japanese Patent Application No. 2018-187603, filed Oct. 2, 2018, the entire contents of which are incorporated herein by reference.

BACKGROUND OF THE INVENTION

1. Field of the Invention

The present invention relates to an electronic device that executes processing on displayed characters.

2. Description of the Related Art

Techniques for improving the efficiency of inputting a text on a device with the employment of a display-integrated touch panel have been suggested (for example, Jpn. Pat. Appln. KOKAI Publication No. H6-51891).

SUMMARY OF THE INVENTION

According to one aspect of the present invention, there is provided an electronic device comprising: a display; a designation device configured to designate any range of a character string displayed on the display by a user; and a processor. The processor is configured to target as a processing target at least one character included in the range designated by the designation device, determine to which of a plurality of predetermined combinations a combination of a character type of the at least one character and a position of the at least one character in the range corresponds, and execute a process on characters included in the designated range based on the determined combination.

BRIEF DESCRIPTION OF THE SEVERAL VIEWS OF THE DRAWING

FIG. 2 is a block diagram for showing the structure of an electronic circuit of the electronic dictionary device according to the present embodiment;

FIG. 3 is a flowchart of the process focusing on a link search in response to an operation of touching a character string according to the present embodiment;

FIG. 4 is a diagram for showing an example of a character string in the explanatory information on the display, which is highlighted in inverted color according to the present embodiment;

FIG. 5 is a diagram for showing examples of weight calculation for combinations of character types for the first and second characters from among the three character types "Jpn", "Eng", and "Sym", and selection results according to the present embodiment;

FIG. 6 is a diagram for showing exemplary link functions that are set to be available for the character type of the determined leading character according to the present embodiment.

DETAILED DESCRIPTION OF THE INVENTION

The present invention applied to an electronic dictionary device according to the present embodiment is explained below with reference to the drawings.

Figure 1:
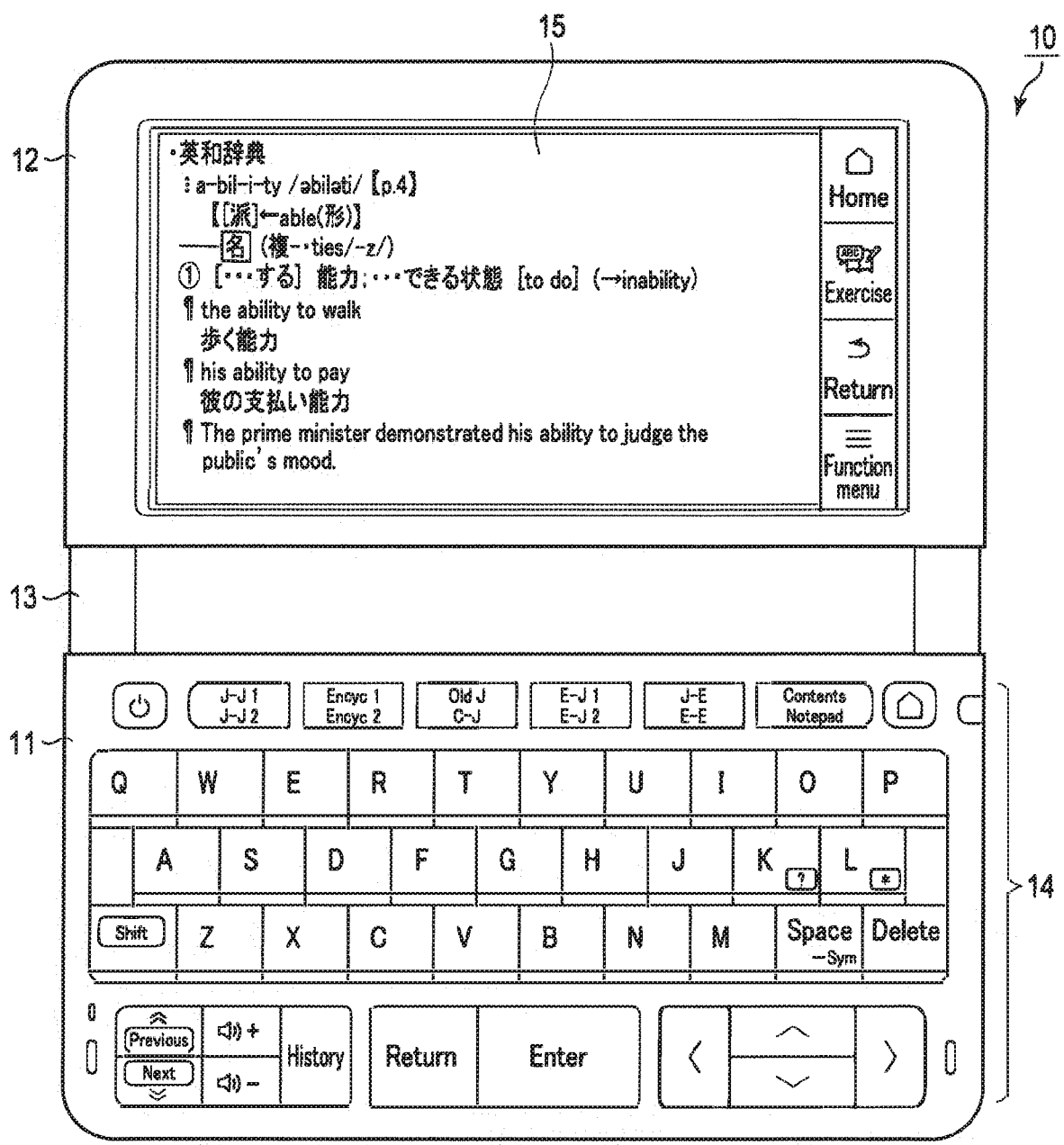
FIG. 1 is a diagram for showing the exterior structure of an electronic dictionary device according to an embodiment of the present invention.

FIG. 1 is a diagram for showing the exterior structure of an electronic dictionary device 10 according to the present embodiment.

The electronic dictionary device 10 includes a main body structure in which a main body casing 11 and a cover casing 12 are hinged together by hinges 13 in an openable and closable manner. A key input device 14 including a power (ON) key, menu keys, character input keys, dictionary selection keys, and up/down/left/right cursor keys, is provided on the surface of the main body casing 11.

A touch panel display 15, having a backlight-attached liquid crystal color display screen, is provided approximately over the entire cover casing 12. When the user of the electronic dictionary device 10 touches the surface of the display 15, the two-dimensional coordinate data corresponding to the touched position is detected.

FIG. 2 is a block diagram for showing the structure of the electronic circuit of the electronic dictionary device 10.

The electronic circuit of the electronic dictionary device 10 incorporates a CPU (processor) 16, which is a computer. The CPU 16 controls the operations of the circuit components in accordance with an information display control program 17a that is stored in advance in a storage medium 17 such as a flash ROM; an information display control program 17a that is read by a storage medium reader 19 from an external storage medium 18 such as a memory card and stored in the storage medium 17; or an information display control program 17a that is downloaded from an external communication device 30 such as a smartphone by way of a near field communication device 20 and stored in the storage medium 17.

The key input device 14, touch panel display 15, storage medium 17, external storage medium 18, and storage medium reader 19 are coupled to the CPU 16. In addition, a near field communication device (Bluetooth (trademark)) 20 is also coupled to the CPU 16 to perform communications with the communication device 30.

An information display control program 17a, dictionary database 17b, and history data area 17c and the like are stored in the storage medium 17.

Stored as the information display control program 17a are a system program that controls the entire operation of the electronic dictionary device 10; a dictionary search program that executes an entry word search, idiom search, example search, history search and the like based on various kinds of dictionary data stored in the dictionary database 17b and search history data stored in the history data area 17c; and a link search processing program that executes the next entry word search, idiom search, example search, or history search by designating a character string from the currently displayed dictionary information.

The dictionary database 17b includes dictionary data of different English-Japanese dictionaries, an English-English dictionary, an idiom dictionary, an example database, a Japanese-Japanese dictionary and the like. Explanatory information in connection with the words and sentences, including definitions of entry words and translations of sentences, is entered into the dictionary data of these dictionaries.

Stored in the history data area 17c are previously searched entry words, idioms, and example sentences in connection with the information of a search target dictionary for the explanatory information previously displayed as a search result in accordance with an entry word search, idiom search, or example search.

The operation according to the present embodiment is explained next.

FIG. 3 is a flowchart focusing on the process of a link search executed when a character string in the explanatory information is designated by a touch operation of the user of the electronic dictionary device 10, who selects any dictionary and inputs an entry word, as a result of which the explanatory information of the definitions and translations of sentences is displayed on the touch panel display 15.

The process described below is executed by the CPU 16, mainly based on the information display control program 17a stored in the storage medium 17.

First, with a dictionary already being selected, the CPU 16 receives input of an entry word (step S101).

The CPU 16 searches the dictionary database 17b for the explanatory information of the definitions of words or translations of sentences in connection with the received entry words or sentences of the dictionary, and displays the explanatory information obtained as a search result on the touch panel display 15 (step S102).

With this display presented, the CPU 16 determines whether or not a touch operation is performed at a position where a character string in the explanatory information is presented on the display 15 (step S103). If "no" is determined at step S103, it is further determined whether any other key operation is performed on the key input device 14 (step S104). If "no" is determined at step S104, the process returns to step S103 to stand by for a touch operation or key input.

If it is determined at step S104 that a key operation is performed on the key input device 14 ("yes" at step S104), the CPU 16 executes a process corresponding to the operated key. The detailed description of this process is omitted since it is not directly related to the technique of the present embodiment.

At step S103, when it is determined that a touch operation is performed at a position where a character string in the explanatory information is presented on the display 15 ("yes" at step S103), the CPU 16 highlights in inverted color the characters at the position corresponding to the coordinate data of the touch operation obtained from the touch panel, in the character string of the explanatory information presented on the display 15, to indicate that the touch operation has been received (step S105).

Thereafter, as a touch to the display 15 by the user's touch operation is ended, the CPU 16 determines whether the input of coordinate data from the touch panel is discontinued (step S106).

If it is determined that, with the user's touch operation continued, the input of the coordinate data from the touch panel is still being continued (no at step S106), the CPU 16 returns to the operation at step S105 to highlight in inverted color the region currently being touched.

While the touch operation is continued on the display 15 with the user's finger, a touch pen or the like, the CPU 16 repeats the operations of steps S105 and S106, and highlights in inverted color the region of the character string presented in the manipulated region.

In the example of FIG. 4, a character string "(1) Ei-go de JAPAN to iu." (It is called "Japan" in English language.) is temporarily selected and highlighted in inverted color in accordance with the user's touch operation. The user has intended to touch (select) "Ei-go de JAPAN to iu." on the display 15, but has actually first touched the region where "(1)" is presented, which was not meant to be touched. Without discontinuing the touch operation, the user continues to touch the region including "Ei" (English), "go" (language), . . . , and "." (period) in this order. This character string is part of the explanatory information corresponding to the entry word "nihon" (Japan) on the display 15.

When it is determined that the user's touch operation is discontinued on the display 15, where the range of the character string is being designated, and that the input of the coordinate data from the touch panel being pressed is ended ("yes" at step S106), the CPU 16 executes a weight calculation, starting from the beginning of the character string designated by the touch operation (the leading position in the writing of the selected character string) (step S107). If the character string is in Arabic characters or other characters that read from right to left, the leading position will be the right end of the selected character string.

In the description of the present embodiment, general rules are applied to the characters that constitute a character string. In particular, when "phonogramic characters" including phonemic characters such as alphabets used in English and Russian, and syllabic characters such as Japanese kana characters and Korean Hangeul characters, "logographic characters" including Chinese characters used in Japanese and Chinese, and "ideographic characters" including numerals, parentheses, punctuation symbols and mathematic symbols are considered, "phonogramic characters" and "logographic characters" used to represent expressions in any language are simply referred to as "characters" of Japanese, English, and the like, whereas "ideographic characters" whose meanings are clearly understood but less related to pronunciation are simply referred to as "symbols". The "symbols" are ideographic characters and can thus also be considered as characters.

According to the present embodiment, weight information is added only to the leading two characters of a character string undergoing a touch operation, in accordance with their positions from the leading side; for example, "first character=3", "second character=2", and "third character and after=0".

Moreover, for the character type "Jpn" of characters regarded as Japanese, character type "Eng" of characters or alphabets regarded as English, and character type "C/K/R" of characters regarded as Chinese, Korean or Russian, "weight information=2" is added in accordance with the character types, whereas for the character type "Sym" of what is regarded as a symbol (ideographic character), "weight information=1" is added in accordance with the character type.

FIG. 5 is a diagram for showing examples of the weight calculation for combinations of character types for the first and second characters of the explanatory information that is displayed on the display 15 of FIG. 4, from among the three character types "Jpn", "Eng", and "Sym", and the results of determination of the character types of the leading character.

In the example of the character string "(1) Ei-go de JAPAN to iu . . . " of pattern 1, the first character is a parenthesized numeral "(1)", which is of the character type "Sym", and the second character is "Ei", which is of the character type "Jpn". In this pattern, the weight of the first character of the character type "Sym" is (weight information of the first character=3)×(weight of the character type=1), as a result of which the calculation value "3" is obtained by the CPU 16. On the other hand, the second character of the character type "Jpn" is (weight information of the second character=2)×(weight of the character type=2), as a result of which the calculation value "4" is obtained by the CPU 16. Thus, in the subsequent processing, the CPU 16 deals with the character type "Jpn" of the second character, having a greater weight calculation value than the first character, as the leading character type, instead of the character type of the first character.

Furthermore, the CPU 16 deals with sequential English characters of a word, such as "JAPAN" in the exemplary character string "JAPAN to iu", as a single character set. As in pattern 4, the first character is "J(APAN)", which is of the character type "Eng", whereas the second character is "to", which is of the character type "Jpn". The weight of the character type "Eng" of the first character is (weight information of the first character=3)×(weight of character type=2), as a result of which the calculation value "6" is obtained by the CPU 16. On the other hand, the weight of the character type "Jpn" of the second character is (weight information of the second character=2)×(weight of character type=2), as a result of which the calculation value "4" is obtained by the CPU 16. Thus, the character type "Eng" of the first character set "J(APAN)" having a greater weight calculation value is determined as the leading character type, with reference to the character type of the second character.

As mentioned above, sequential English characters of a word are recognized and selected as a single set. In a character string that includes a plurality of English words, symbols such as spaces, periods, commas, colons, etc. are always inserted between the words. If any of these symbols are included, the CPU 16 determines that the English word regarded as the first character and the next English word regarded as the second character are both of the character type "Eng". If this is the case, calculation for determining the leading character type is not performed, as shown in pattern 5 of FIG. 5.

As described above, in the patterns other than pattern 1, the actual leading character of a touch operation is selected as a leading character. The leading character type determination result is therefore the same as in the touch operation. In this manner, a suitable selection function can be realized.

Based on the results of weight calculation for the character type of the first character and the character type of the second character, the character type of the character having a greater weight calculation value is determined as the leading character selected in the touch operation (step S108).

In accordance with the character type of the leading character determined in this manner, the CPU 16 displays a chart of available link functions, and terminates the process of FIG. 3. Furthermore, if a link function is selected, the selected function is implemented (step S109).

FIG. 6 is a diagram for showing the relationship between the leading character types and link functions that are set to be available. The "entry word jump" in this chart indicates a function of changing to a search for a dictionary that contains the designated character string as an entry word. The "idiom/example jump" indicates a function of changing to a search for a dictionary that contains the designated character string in idioms or examples. The "audio" (or "audio output") indicates a function of pronouncing a word of the designated character string when the character string is English. The "highlighter" (or "highlighting") indicates a function of highlighting the designated character string in any color from a predetermined set of colors on the display 15, as if being marked by a highlighter. The "textbook" (or "textbook-typeface representation") indicates a function of changing the typeface of the designated character string to be displayed to a textbook typeface and increasing the font size.

Figure 7A:
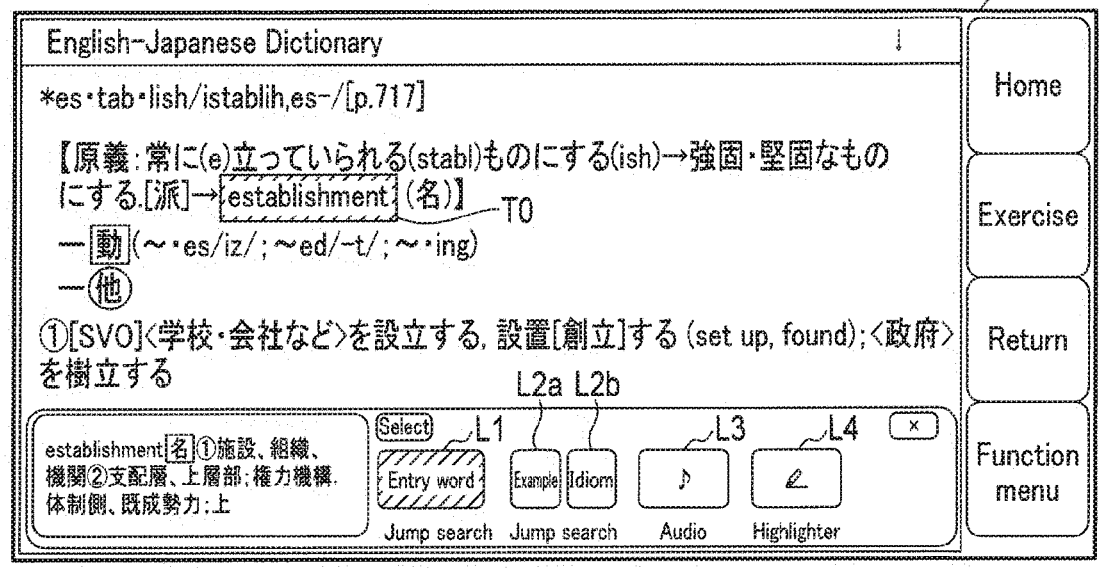
FIGS. 7A and 7B are diagrams for exemplary displays in response to a touch operation on the display according to the present embodiment.

In the example of FIG. 7A, the Japanese explanatory information of the English-Japanese dictionary that corresponds to an English word "establish" as an entry word is presented on the display 15. On this display 15, an English word "establishment" T0 that appears in the explanatory information of the English word "establish" is selected by a touch operation, and the "entry word jump" is selected. As a result, the English word "establishment" and its explanatory information are being displayed in a mini dictionary window in the lower left corner of the display 15.

Figure 7B:
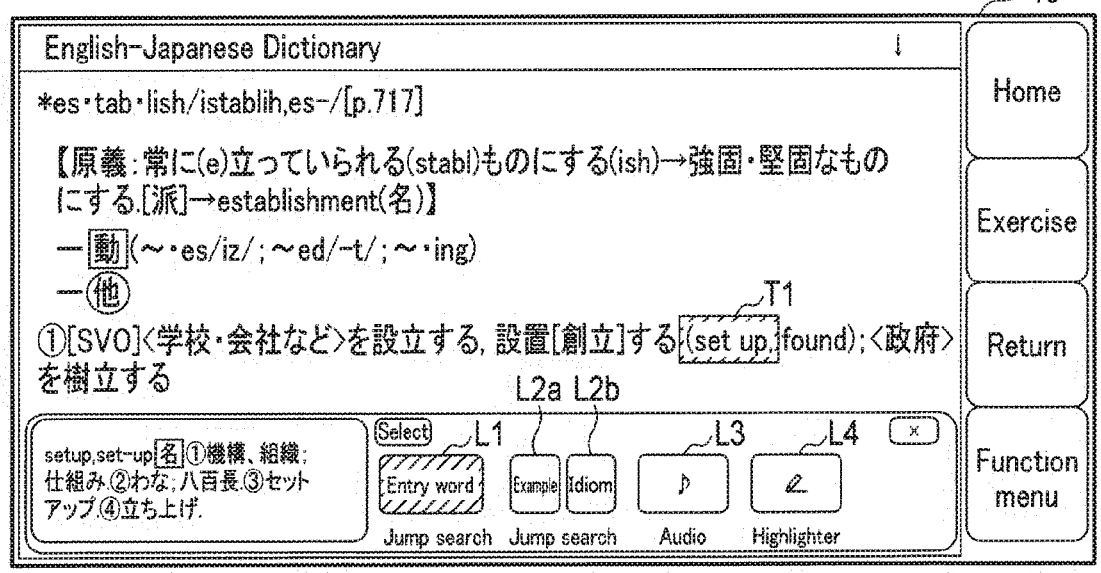

Thereafter, a character string "(set up," T1 in the explanation is selected by touch operation, and the "entry word jump" is selected as shown in FIG. 7B. As a result, a new entry word "set up", which has been selected in accordance with the determined leading character type, is being displayed together with its explanatory information in the lower-left mini dictionary window of the display 15.

Of the "(set up," T1, the first character is "(" of the character type "Sym", and the second character is "s" of the character type "Eng". The CPU 16 therefore determines the second character "s" as the leading character in the same manner as pattern 1 of FIG. 5.

In this determination, it is assumed that the first character "(", which is of the character type "Sym", is touched with the user's finger by touch operation to include, against the user's intention, the symbol before an intended character string, and therefore the English character positioned as the second character is regarded as the leading character instead of the symbol positioned as the first character.

In accordance with the determination result of the character string, "entry word jump" button L1, "idiom/example jump" buttons L2a and L2b, "audio" button L3, "highlighter" button L4 are displayed at the bottom of the display 15 as available link functions based on the link functions that are set to be available as in FIG. 6.

In addition, the "entry word jump" button L1 at the leading position of these buttons is highlighted in inverted color, as default, thereby prompting the next operation.

By designating one of these buttons L1 to L4 by touch operation, a desired search or processing in relation to the selected character string "set up" is implemented.

In the explanation of the present embodiment, a weight calculation is executed in accordance with the character types of the first and second characters when a character string is designated by touch operation. However, in place of the weight calculation, a look-up table (LUT) may be adopted according to the present embodiment so that the character type of the character that the user has intended to select by touch operation can be uniquely determined, based on the character types of the first and second characters.

Furthermore, in the explanation of the present embodiment, link functions that are set to be available in accordance with the determined character type are presented on the display 15, thereby prompting the user to select one of the functions. However, a processing order may be such that the user may first select a desired function, for example "highlighter" function, and then select any character string with the user's finger by touch operation to realize this function. In this manner, by taking into account a displacement of the user's touch operation, the actual effective range for the character string may be determined, and thereby the selected function may be implemented on the character string obtained as the determination result.

According to the present embodiment, candidate character types of leading characters are selected by touch operation on the touch panel. The embodiment is not limited to this, and the candidate character types of leading characters can be selected from the cursor position by the key input device.

The character types according to the present embodiment should include at least two different types of ostensibly Japanese character type, ostensibly alphabet or English character type, ostensibly Chinese/Korean/Russian character type, and any other character type.

According to the present embodiment, the user's intended touch operation position can be accurately estimated by taking into account some displacement of the position of the touch operation, as discussed above.

In addition, according to the present embodiment, the first character and the second character subsequent to the first character of the character string selected by the touch operation are targeted, and the character types of the intended characters in the touch operation are determined based on the relationship between the character type and the distance from the operated position. Thus, the effect of any characters that are away from the position of the touch operation can be eliminated, and the position of the user's intended touch operation can be estimated with a greater degree of accuracy.

In addition, according to the present embodiment, the relationship between the touched position and positions of characters adjacent to the touched position and the character type are individually weighted so that the touched character can be estimated from the overall weighted value. By suitably setting the weight information, the position of the user's intended touch operation can be estimated with a still greater degree of accuracy.

According to the present embodiment, when a character string containing a plurality of characters is designated, the range of an ostensibly intended character is determined based on the character placed at the leading position. Thus, even if the user may trace an intended character string in the reverse direction of the character string, the touch operation is effective. This enhances the degree of operational freedom.

In addition, according to the present embodiment, the touched character is estimated when the touch operation of a character string is determined as being completed. Thus, by taking into account the entire character string touched, various searches or processing can be conducted.

According to the present embodiment, available functions can be offered in accordance with the estimated character type. Thus, ostensibly unnecessary functions can be eliminated from the display, enhancing the effectiveness in use of the dictionary.

The present embodiment is applied to a specially designed electronic dictionary device, but the present invention is not limited thereto. A dictionary function may be designed into an application program and installed in a portable data processing device such as a smartphone and a tablet.

The present invention is not limited to the above embodiments, and can be modified without departing from the gist of the invention when realizing the invention.

The embodiments may be combined wherever possible, which would produce combined effects. Furthermore, the above embodiments include various steps of the invention, and various inventions can be drawn from suitable combinations of the disclosed structural components. For example, even if some of the structural components are removed from the entire structure of an embodiment, an invention may be drawn with these components removed as long as the above-mentioned problem to be solved by the invention can be solved and the above-mentioned effects of the invention can be attained.

For example, the invention may have such a structure that, the processor of the electronic device according to the present embodiment is configured to target as a processing target at least one character included in the range designated by the designation device, determine to which of a plurality of predetermined combinations a combination of a character type of the at least one character and a position of the at least one character in the range corresponds, and execute a process on characters included in the designated range based on the determined combination.

If this is the case, the processor may be configured to select a process to be executed on the characters included in the designated range based on the determined combination, to determine a character type of a leading character of a plurality of characters corresponding to the processing target based on the determined combination, or to determine a leading character of characters corresponding to the processing target based on the determined combination.

Furthermore, the processor may be configured to determine a leading character of the characters included in the designated range based on the determined combination, determine a character type of the determined leading character, and select a process to be executed on the characters starting with the leading character, based on the determined character type.

Furthermore, the processor may be configured to target as the processing target a plurality of characters included in the designated range, and determine to which of a plurality of predetermined combinations a combination of character types of the characters and positions of the characters corresponds.

What is claimed is:

1. An electronic device comprising:
   a display;
   a touch panel configured to allow a touch operation to designate any range on the display;
   a memory storing selection information to be used to select a specific character type, the selection information including a plurality of patterns which respectively correspond to a plurality of combinations of any one of a plurality of character types for a first character and any one of a plurality of character types for a second character, and including a plurality of specific character types which respectively correspond to the plurality of patterns; and
   a processor,
   the processor being configured to:
   execute a first determination process of determining a first character type for the first character and a second character type for the second character in a designated character string in any range which is designated by the touch operation on the display;
   execute a second determination process of determining, based on the selection information stored in the memory, a third character type as the specific character type to be selected for the designated character string, which corresponds to a combination of the determined character type for the first character and the determined character type for the second character; and execute a designated process on the designated character string when the third character type determined by the second determination process corresponds to the first character type, and execute the designated process on a corrected character string which does not include the first character when the third character type determined by the second determination process corresponds to the second character type.

2. The electronic device according to claim 1, wherein the processor is configured to acquire a targeted character string to be processed, from the designated character string, the targeted character string including a leading character of the third character type in characters included in the designated character string.

3. The electronic device according to claim 2, wherein the processor is configured to determine the character type of the leading character at a time of completion of the touch operation, in which the user touches the touch panel.

4. The electronic device according to claim 2, wherein the processor is configured to determine to which of at least two types the character type of the leading character belongs, the at least two types including an ostensibly Japanese character type, an ostensibly alphabet or English character type, an ostensibly Chinese/Korean/Russian character type, and a type of ostensibly some other character.

5. The electronic device according to claim 1, wherein the processor is configured to target as a processing target the characters included in the designated character string, and determine to which of the plurality of combinations a combination of character types of the characters and positions of the characters corresponds.

6. The electronic device according to claim 5, wherein the selection information includes weight values respectively corresponding to character types and weight values respectively corresponding to positions of characters;
the processor is configured to determine the third character type to be selected for the designated character string in the second determination process, by comparing a first calculation value with a second calculation value, the first calculation value being obtained from a weight value for the first character in the selection information and from a weight value for the first character in the designated character string, the second calculation value being obtained from a weight value for the second character in the selection information and from a weight value for the second character in the designated character string.

7. The electronic device according to claim 1, wherein the process includes at least one of entry word jump, idiom/example jump, audio output, highlighting, and textbook-typeface representation, and
the processor is configured to determine whether or not the process is executable based on the determined combination.

8. The electronic device according to claim 1, wherein the processor is configured to execute, as the designated process, a process of searching a dictionary database for the corrected character string, when the designated process is designated to the process of searching the dictionary database using an entry word and the first character type is not allowed to be the entry word.

9. The electronic device according to claim 1, wherein the plurality of character types include a character type corresponding to a national language character and a character type corresponding to a symbol character, and
the selection information indicates that the character type corresponding to the national language character is to be selected in preference to the character type corresponding to the symbol character as the third character type, when designated character string includes the national language character and the symbol character.

10. The electronic device according to claim 1, wherein the memory further stores definition information which defines a character type allowed to be the leading character in a character string to be processed in each of a plurality of processes, and
the processor is configured to execute the designated process on the corrected character string, when the designated character string is not determined to be allowed as a target of the designated process based on the definition information.

11. The electronic device according to claim 10, wherein the memory stores, for each of the plurality of processes including a process of searching a dictionary database, the definition information which defines the character type allowed to be the leading character in the character string to be processed in each of the plurality of processes.

12. The electronic device according to claim 1, wherein the processor is configured to correct a position of a leading character of the designated character string upon displacement of the position of the leading character in designation by use's touch operation on the touch panel.

13. The electronic device according to claim 12, wherein the selection information includes weight values respectively corresponding to character types;
the processor is configured to determine the third character type to be selected for the designated character string in the second determination process, by comparing a first calculation value with a second calculation value, the first calculation value being obtained from a weight value for the first character in the designated character string, the second calculation value being obtained from a weight value for the second character in the designated character string.

14. The electronic device according to claim 13, wherein the plurality of character types include a character type corresponding to a national language character and a character type corresponding to a symbol character, and
the selection information indicates that a weight value for the national language character is larger than a weight value for the symbol character.

15. The electronic device according to claim 12, wherein the selection information includes weight values respectively corresponding to character types and weight values respectively corresponding to positions of characters;
the processor is configured to determine the third character type to be selected for the designated character string in the second determination process, by comparing the first calculation value with the second calculation value, the first calculation value being obtained from the weight value for the first character in the selection information and from the weight value for the first character in the designated character string, the second calculation value being obtained from the weight value for the second character in the selection information and from the weight value for the second character in the designated character string.

16. A control method for an electronic device including a display, a touch panel configured to allow touch operation to designate any range on the display, a memory storing selection information to be used to select a specific character type, the selection information including a plurality of patterns which respectively correspond to a plurality of combinations of any one of a plurality of character types for a first character and any one of a plurality of character types for a second character, and including a plurality of specific character types which respectively correspond to the plurality of patterns, and a processor, the method comprising:

executing a first determination process of determining a first character type for the first character and a second character type for the second character in a designated character string in any range which is designated by the touch operation on the display, by the processor;

executing a second determination process of determining, based on the selection information stored in the memory, a third character type as the specific character type to be selected for the designated character string, which corresponds to a combination of the determined character type for the first character and the determined character type for the second character, by the processor; and execute a designated process on the designated character string when the third character type determined by the second determination process corresponds to the first character type, and execute the designated process on a corrected character string which does not include the first character when the third character type determined by the second determination process corresponds to the second character type.

17. The control method according to claim 16, further comprising:

acquiring a targeted character string to be processed, from the designated character string, the targeted character string including a leading character of the third character type in characters included in the designated character string, by the processor.

18. The control method according to claim 17, wherein the method further comprises determining the character type of the leading character at a time of completion of the touch operation, in which the user touches the touch panel, by the processor.

19. The control method according to claim 16, further comprising:

targeting as a processing target the characters included in the designated character string, and determining to which of the plurality of combinations a combination of character types of the characters and positions of the characters corresponds, by the processor.

20. The control method according to claim 19, wherein the selection information includes weight values respectively corresponding to character types and weight values respectively corresponding to positions of characters;

the control method further comprising:

determining the third character type to be selected for the designated character string in the second determination process, by comparing a first calculation value with a second calculation value, the first calculation value being obtained from a weight value for the first character in the selection information and from a weight value for the first character in the designated character string, the second calculation value being obtained from a weight value for the second character in the selection information and from a weight value for the second character in the designated character string, by the processor.

21. The control method according to claim 16, wherein the process to be executed includes at least one of entry word jump, idiom/example jump, audio output, highlighting, and textbook-typeface representation, and the method further comprises determining whether or not the process is executable based on the determined combination, by the processor.

22. A non-transitory computer-readable storage medium having a program stored thereon which controls a computer incorporated in an electronic device that includes a display, a touch panel configured to allow a touch operation to designate any range on the display, and a memory storing selection information to be used to select a specific character type, the selection information including a plurality of patterns which respectively correspond to a plurality of combinations of any one of a plurality of character types for a first character and any one of a plurality of character types for a second character, and including a plurality of specific character types which respectively correspond to the plurality of patterns, to perform functions comprising:

executing a first determination process of determining a first character type for the first character and a second character type for the second character in a designated character string in any range which is designated by the touch operation on the display;

executing a second determination process of determining, based on the selection information stored in the memory, a third character type as the specific character type to be selected for the designated character string, which corresponds to a combination of the determined character type for the first character and the determined character type for the second character; and execute a designated process on the designated character string when the third character type determined by the second determination process corresponds to the first character type, and execute the designated process on a corrected character string which does not include the first character when the third character type determined by the second determination process corresponds to the second character type.

* * * * *